June 10, 1969     A. J. LITTLE     3,449,736

METER READING SYSTEM

Original Filed Aug. 7, 1964

INVENTOR
Arthur J. Little

By William J. Newman
Attorney

United States Patent Office 3,449,736
Patented June 10, 1969

3,449,736
METER READING SYSTEM
Arthur J. Little, Springfield, Ill., assignor to Stewart-Warner Corporation, Chicago, Ill., a corporation of Virginia
Original application Aug. 7, 1964, Ser. No. 388,099, now Patent No. 3,387,267, dated June 4, 1968. Divided and this application Feb. 23, 1968, Ser. No. 707,664
Int. Cl. G08c 19/16
U.S. Cl. 340—204      3 Claims

ABSTRACT OF THE DISCLOSURE

The following specification describes a portable arrangement for reading a utility meter from a remote position. The axially spaced dials of the meter each have an associated plurality of series of protuberances or marks with each mark in a series spaced axially in accordance with binary code corresponding to a respective decimal digit. Each series is positioned circumferentially so that one series corresponding to the associated dial reading is aligned with axially movable contacts or a pick up device to transmit a signal corresponding to each scanned marking over a wire to the remote position.

---

This application is a division of the copending application of Arthur J. Little, Ser. No. 388, 099, filed Aug. 7, 1964, now U.S. Patent 3,387,267 and relates to telemetering and more particularly to apparatus particularly suited for remotely reading utility meters or the like.

Utility companies have a need for means of improving their present system of reading meters. Most of the inherent disadvantages of the present system lie in the necessity for having the meter reader enter the building where the meter is located. In many cases this causes an undesirable disturbance to the customer and is often quite time consuming for the meter reader. The problem of "skips" where the customer is not at home causes the companies a good deal of trouble and expense. Errors by the meter readers also cause extra expense and harm customer good will.

These and other problems create the need for meter reading means which simplify the meter reading function allowing it to be done at a location outside of the building. A reading means which eliminates the sensory observation of the reader reduces the possibility of error.

An ideal system would be one in which all the utility meters are automatically readable at a central location, perhaps at the utility building. It would of course be an exhorbitant, if not prohibitive, expense to initiate such a program, however, unless inexpensive means attachable to present meters are employed.

It is therefore an object of this invention to provide a system for reading utility meters, or the like, from a remote location.

It is also an object of this invention to provide a system for remotely reading meter dials in which the dials or associated digit wheels are properly aligned with a scanning or reading device.

Other objects and advantages of this invention will become apparent upon a further reading of the specification when taken in view of the accompanying drawings.

Briefly, a remote meter reading system embodying the teachings of this invention comprises means driven by a utility meter or the like including a set of odometer dials each having physical features such as protuberances representative of a set of numerals. Means such as belt driven contacts scan across the odometer dials responsive to a driving signal from the remote location. The scanning means cause electrical fluctuations which operate a registering device at the remote location in accordance with the reading of the meter.

Figure 1:
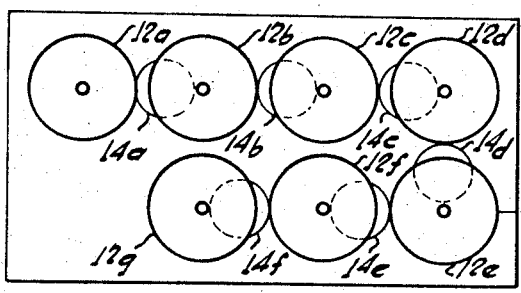
FIG. 1 is a diagram, in somewhat schematic form, of the mechanical elements of a system embodying the teachings of this invention.

Reference is now made to the drawings and particularly to FIG. 1 for a more detailed description of a device of a system embodying the teachings of this invention. Therein is shown a utility meter 10 to measure, for example, gas, water or electric usage, which is normally located within a building. These meters usually have a set of decimal integrating meter dials 12a through 12g. This type of dial indicator is well known in the utility meter art with each significant digit of the quantity being measured represented in descending order from dial 12a–12g. The torque required to drive the meter is applied to the lowest significant digit dial 12g and the torque is transferred to each ascending decimal dial by means of pinions 14a–14f.

Assuming that the utility company is interested only in the readings of the four highest digit dials 12a–12d, a cam 16 is attached to the fifth highest dial 12e. As the cam 16 rotates with the dial 12e, it steps a ratchet wheel 18 through ratchet lever and spring means 20 once for each rotation of the dial 12e. The ratchet wheel 18 is attached to the lowest digit wheel 22d of a four wheel odometer 22. Thus, the wheel 22d will make one revolution for every revolution of the lowest desired significant digit dial 12d. The wheel 22c of the odometer is geared to the low digit wheel 22d so that it will make one step, or one-tenth of a revolution, for every revolution of the wheel 22d and will correspond to the revolutions of the second lowest significant digit dial 12c of the meter. The wheel 22b is geared to the wheel 22c and wheel 22a is geared to the wheel 22b so that they correspond, respectively, to the meter digit dials 12b and 12a.

Instead of printed numerals about the periphery of the odometer wheels 22a through d, a series of protuberances 24 are provided in a code arrangement. The numbers represented by the code or series of markings formed by the protuberances or blanks on each of the wheels 22 are arranged consecutively about the periphery in circumferentially spaced positions with each series axially spaced along the respective wheel. The wheels, shown in FIG. 1, each carry the numbers zero through nine in a binary code arrangement. Thus, as may be seen in FIG. 1 the binary representation of numbers 0–5 are seen on odometer wheel 22a and the binary representation of numbers 6–9, 0 and 1 are seen on wheel 22d.

A scan of the bumps along a line parallel to the axis of the odometer wheels 22 tells the position of each of the odometer wheels and hence the number of revolutions of each wheel from a given reference such as the last meter reading. A set of contacts 26 carried by a belt 28 traveling along a linear path 30a adjacent the periphery of the wheels 22 is adapted to engage each protuberance therealong. A plate 38 with a series of protuberances 40 is positioned adjacent the linear path 30b of the belt 28. The protuberances 40 are also arranged in a binary code corresponding to respective decimal in digits so that the contacts 26 passing thereby are operated in accordance with a number identifying the particular meter being read.

Figure 2:
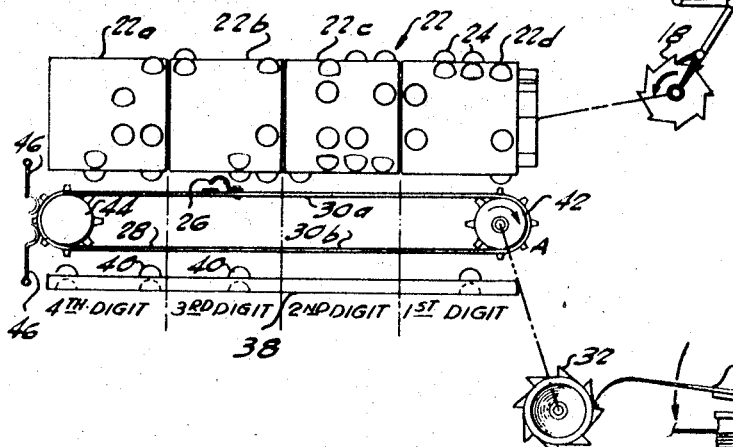
FIG. 2 is an end view of the belt or sprocket shown in FIG. 1.

The belt 28 is preferably driven by a ratchet wheel 32 in cooperation with a ratchet arm mechanism 34 actuated by a solenoid 36. The solenoid 36 is energized in a manner to be hereinafter set forth. The mechanism as shown in FIG. 1 is designed to step in a clockwise direction thirty-eight times from a starting point indicated A along the path adjacent the right-hand belt sprocket 42 for a complete reading of the identifying number and meter reading. If the solenoid 36 is pulsed 38 times the contacts 26 will travel across the number plate 38 around the left-hand sprocket wheel 44, past the four odometer wheels 22a through d and back to position A. The contacts 26 will close responsive to each engagement with a protuberance 24, 40 along the belt path which will affect an electric circuit connected to brushes 46 engaging commutators 47 (FIG. 2) on the belt.

Figure 3:
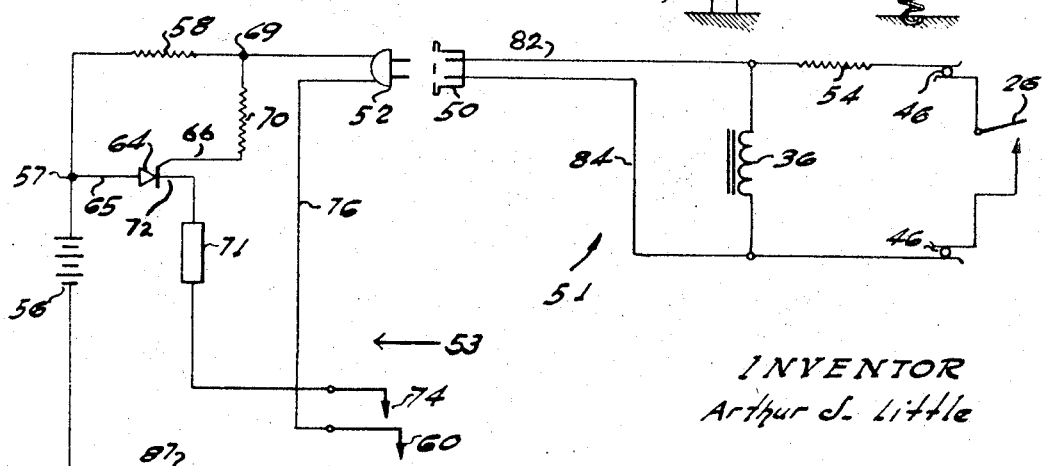
FIG. 3 is a schematic diagram of the electrical apparatus utilized in the remote meter reading system of FIG. 1.

Reference is now made to FIG. 3 of the drawings which shows in schematic form the electrical circuit for the meter reading apparatus. There is shown a female receptacle 50 and everything in the circuit 51 connected to it is located at the utility meter 10 itself. All components in the circuit 53 connected to the male plug 52 are located at a position which is remote from the meter such as, for example, immediately outside the building or at a central reading location.

As may be been, the solenoid 36 which drives the belt 28 is connected directly to the female receptacle 50. The contacts 26 are series connected with brushes 46 and resistor 54 across the solenoid 36 and receptacle 50.

The circuit 53 at the remote location comprises a power source 56 series connectable across the male plug 52 with resistor 58 and make contacts 60 operable by a cam 62. A silicon controlled rectifier 64 has its anode 65 connected to the junction 57 between the positive terminal of power supply 56 and one end of resistor 58. The gate 66 of the silicon controlled rectifier is connected through resistor 70 to the junction 69 between the other end of resistor 58 and plug 52. A load 71 which might take the form of a number indicator or an IBM card punch is connected at one end to the cathode 72 of the silicon controlled rectifier 64 and at its other end to another set of make contacts 74 operable by the cam 62.

The circuits 51 and 53 function to record the meter readings as follows. The meter reader inserts plug 52 in the receptacle 50 and causes the cam to rotate either by a hand crank or suitable motor (not shown). In the present case the cam 62 is operated through 38 revolutions for one reading of the meter and each revolution of the cam 62 operates the belt 28 one step. As the cam 62 rotates the first lobe 80 closes contacts 60 to connect the power source 56 to the solenoid 36 through a circuit from the positive terminal through junction 57, resistor 58, junction 69, plug 52, receptacles 50, conductor 82, solenoid 36, conductor 84, receptacle 50, plug 52, conductor 76, contacts 60 and conductor 87. Each time contacts 60 close, the magnet 36 energizes and the belt is caused to advance one step.

It may be seen that the condition of contacts 26 determines the amount of current flowing from the power source 56 in the remote unit 53 since they provide a parallel circuit about the solenoid 36. That is, if the contacts are closed a greater current flows through resistor 58 in the remote unit 53 which is sensed by the gate 66 of the silicon controlled rectifier 64. The increased current signal at the gate 66 will trigger the silicon controlled rectifier into conduction through the load 71 as soon as the second cam lobe 82 closes contacts 74. This circuit leads from the positive terminal of power supply 56, through anode 65 and cathode 72 of the silicon controlled rectifier 64, load 71, contact 74, contacts 60, conductor 87 to the negative terminal of the power supply 56.

If contacts 26 are not closed because of the absence of a protuberance at that particular step along the linear paths of the belt, the current passing through resistor 58 is insufficient to gate the silicon controlled rectifier 64 and no current passes through the load register 71 when the contacts 74 and 60 close.

As previously discussed it is desirable that the meter reading system have a capability of being used individually or of becoming part of an overall system which may be naturally developed as economics dictate. As a first step in the establishment of an overall system the mechanical means shown in FIG. 1 and the meter circuit means 51 is installed in those meters where "skips" are prevalent. The receptacle 50 is located at the exterior of the building so as to be readily accessible even though the occupants of the buiding are not present.

The unit 53 is initially a portable device carried by a meter reader with the plug 52 insertable in the receptacle 50 at the buiding exterior. The cam 62 is operated through one revolution by the meter reader with the load register indicating the meter number and the metering reading. In this case the load register takes the form of a small decimal type of integrating register from which the meter reader could transcribe the reading. As soon as enough meters contain the device, however, the load might take the form of a recording head which would mark inexpensive reusable magnetic tape with the meter readings. This tape would be fed into machines at the central office where the complete billing procedure would be automatic.

By a program of putting the apparatus on new meters and adding it to older ones, whole neighborhoods would eventually be covered, and neighborhood reading centers might be set up. By using gas or water pipes as ground connection, one conductor from each meter to the neighborhood center would suffice. By incorporating diodes at the meters one conductor could be made to serve two meters. At first the meter reader would probably visit these neighborhood centers. Then, as more neighborhood centers are set up, they could be wired to substations serving the whole section of a city. Ultimately these substations would be wired to a central station and the whole procedure of meter reading would be completely automatic. The whole conversion would be accomplished in simple steps taken as scheduling permits. At no point would service be interrupted and each step would be economically feasible in itself.

Figure 4:
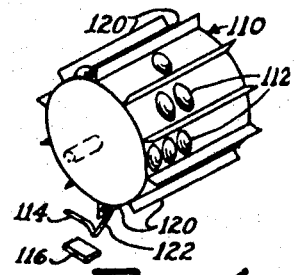
FIG. 4 is a perspective view of one type of digit wheel adapted to be driven directly with a meter dial.

In FIGURE 4, a digit wheel 110 is illustrated. The digit wheel 110 is similar in purpose to digit wheels 22a–22d in that it carries a series of protuberances 112 arranged in rows with the number of protuberances in each row corresponding to a binary translation of the corresponding decimal position of the wheel 110. The protuberances 112 are arranged to operate signal or switch elements 114 and 116 into engagement a number of times as the switch elements 114 and 116 are carried past the protuberances for extending electrical connections in a manner similar to that explained previously for protuberances 24 and contacts 26.

The digit wheel 110, however, is arranged to be driven in any well-known manner directly with the meter dials such as by direct coupling or gearing with the shaft of one of the dials. For example, four digit wheels such as 110 may be arranged to be driven in tandem from the shaft of dial 12c or they may be individually driven from different shafts. In any event with a direct drive, the meter dials and the shafts including the wheels 110 may be positioned so that the switch elements 114 and 116 are aligned intermediate two different rows of protuberances 112 at the time switch elements 114 and 116 are stepped past the protuberances.

In order to ensure that the switch elements 114 and 116 are operated by a specific row of protuberances, a wall or partition 120 is provided on each digit wheel 110 between each row of protuberances. Thus, if the switch element 114, which may include an elongate wire leg 122 for engaging the protuberances, is being carried towards a digit wheel 110 whose protuberances are aligned on opposite sides thereof, the wall 120 will engage the leg 122 forcing the leg 122 to one side or the other of the wall 120. This ensures that the switch elements 114 and 116 are properly operated by one row of protuberances 112. The switch elements 114 and 116 may be operated in accordance with a digit setting representing, for example, one higher digit than the actual digit; however, compensation for this automatically provided on a succeeding reading of the digit wheel setting.

While there has been shown a preferred embodiment including the teachings of this invention, it is obvious that many modifications and additions may made thereto without materially deviating from the scope of the invention.

What is claimed is:

1. In a system for indicating the setting of a meter dial having a plurality of digits marked thereon, a digit wheel adapted to be driven in correspondence with said dial to a position corresponding to the setting of said dial, a signal element adapted to move in one axial direction of said wheel along a predetermined path past said digit wheel, a series of axially spaced apart marking means on said digit wheel for each digit with each series arranged in a code individually corresponding to a respective one of said digits and spaced circumferentially on said wheel for positioning adjacent said path in correspondence with a respective dial setting for operating said signal element to transmit signals corresponding to the position of said digit wheel in response to said signal element being aligned with said one series of marking means and being moved along said path, and means on said digit wheel for engaging said moving signal element for aligning said signal element with said one series of axially spaced marking means adjacent said path to permit operation of said signal element by said one series of spaced apart marking means.

2. In a system for indicating the setting of a meter dial corresponding to any one of a plurality of different digits, the improvement comprising a series of axially spaced apart marking means for each digit indicated by said dial with each series of axially spaced apart marking means arranged in a code individually corresponding to a respective digit and spaced circumferentially for positioning in correspondence with a respective digit indicated by the setting of said dial to locate one series of said spaced apart marking means corresponding to the setting of said meter dial adjacent a predetermined axially extending path, a signal element adapted to move in one direction along said predetermined axially extending path past said one series of spaced apart marking means for transmitting a series of signals corresponding to said one series of spaced apart marking means adjacent said path in response to said signal element being aligned with said one series of spaced apart marking means and said signal element being moved along said path, and means associated with said adjacent one series of marking means for engaging said signal element to align said signal element with said one series of spaced apart marking means adjacent said path to permit operation of said signal element by said one aligned series of marking means.

3. In a system for remotely reading a plurality of meter dials each having a plurality of digits indicated thereon any one of which is set in a predetermined position by a respective dial to indicate a meter dial reading for said dial, the improvement comprising a group of axially spaced apart protuberances for respective digits on each dial arranged in a code individually corresponding to a respective digit with each group of said axially spaced apart protuberances spaced circumferentially and positioned in correspondence with a respective dial to locate the group of axially spaced apart protuberances individually corresponding to each meter dial reading adjacent a predetermined axial extending path, a pair of contacts adapted to move in one direction along said predetermined path past said adjacent spaced apart protuberances for detecting the presence of said adjacent spaced apart protuberances and transmitting sequential signals corresponding to the code represented by said adjacent spaced apart protuberances in response to said spaced apart protuberances being aligned with said pair of contacts being moved along said path, and an axially extending partition wall for each group of protuberances with one wall corresponding to each group located adjacent said path engaged by one of said pair of contacts in response to the movement of said pair of contacts for aligning said one contact with each adjacent group of said spaced apart protuberances in response to the movement of said pair of contacts along said path to permit operation of said pair of contacts by each adjacent group.

References Cited

UNITED STATES PATENTS

| | | | |
|---|---|---|---|
| 2,132,213 | 10/1938 | Locke | 340—204 |
| 2,724,183 | 11/1955 | Edison | 340—204 |
| 2,719,284 | 9/1955 | Roberts | 340—204 |
| 2,922,995 | 1/1960 | Hohmann | 340—204 |

THOMAS B. HABECKER, *Primary Examiner.*

U.S. Cl. X.R.

335—140, 186; 340—151